United States Patent
Fitzmorris et al.

(10) Patent No.: US 10,208,862 B2
(45) Date of Patent: Feb. 19, 2019

(54) SEAL RING FOR HYDROGEN COOLED GENERATOR

(71) Applicant: General Electric Company, Schenectady, NY (US)

(72) Inventors: Daniel James Fitzmorris, Clifton Park, NY (US); Anthony James George, Clifton Park, NY (US); Anthony Salvatore Arrao, Clifton Park, NY (US); Anand Shankar Tanavde, Slingerlands, NY (US); Matthew Robert Martin, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 915 days.

(21) Appl. No.: 14/595,310

(22) Filed: Jan. 13, 2015

(65) Prior Publication Data
US 2016/0201804 A1 Jul. 14, 2016

(51) Int. Cl.
*F16J 15/16* (2006.01)
*F16J 15/34* (2006.01)
(Continued)

(52) U.S. Cl.
CPC ......... *F16J 15/3452* (2013.01); *F16J 15/164* (2013.01); *F16J 15/442* (2013.01); *H02K 5/124* (2013.01)

(58) Field of Classification Search
CPC ........ H02K 5/124; F16J 15/441; F16J 15/442; F16J 15/443
See application file for complete search history.

(56) References Cited

U.S. PATENT DOCUMENTS 3,199,877 A * 8/1965 Cuny ..................... F16J 15/40
    277/432
4,486,024 A   12/1984 Cooper
(Continued)

FOREIGN PATENT DOCUMENTS

GB    1085194 A *  9/1967  ............... B67C 3/24
GB    2076480 A    12/1981
(Continued)

OTHER PUBLICATIONS

Machine Translation of JPS58184366.*
(Continued)

*Primary Examiner* — Nicholas L Foster
(74) *Attorney, Agent, or Firm* — James W. Pemrick; Ernest G. Cusick; Frank A. Landgraff

(57) ABSTRACT

A seal ring assembly includes a first seal ring axially disposed from a second seal ring. The first seal ring has an axial face opposing an axial face of the second seal ring. A radial oil channel is defined between the two axial faces. Both seal rings have a tapered surface configured to contact a spring. The spring biases the seal rings away from each other via the tapered surface. Both seal rings are disposed in a radially inwardly directed channel. At least one of the seal rings have a plurality of protrusions that extend beyond the axial face. The protrusions are configured to create a passageway to allow oil to flow through the passageway and to allow at least one of the seal rings to move into a desired position by reducing static friction between the axial faces.

20 Claims, 14 Drawing Sheets

(51) Int. Cl.
*F16J 15/44* (2006.01)
*H02K 5/124* (2006.01)

(56) References Cited

U.S. PATENT DOCUMENTS

| | | | |
|---|---|---|---|
| 4,815,748 A | 3/1989 | Schubert | |
| 6,082,740 A * | 7/2000 | Jones | H02K 5/124 |
| | | | 277/578 |
| 6,378,873 B1 | 4/2002 | Mayer et al. | |
| 6,431,550 B1 * | 8/2002 | Tong | F16J 15/442 |
| | | | 277/346 |
| 6,464,230 B1 * | 10/2002 | Tong | F16J 15/3288 |
| | | | 277/355 |
| 6,585,270 B2 | 7/2003 | Tong | |
| 6,685,190 B1 * | 2/2004 | Mayer | F16J 15/3288 |
| | | | 277/355 |
| 7,291,947 B2 * | 11/2007 | Hashiba | F16J 15/26 |
| | | | 277/408 |
| 7,631,879 B2 * | 12/2009 | Diantonio | F16J 15/442 |
| | | | 277/416 |
| 2005/0206249 A1 * | 9/2005 | Hashiba | F16J 15/26 |
| | | | 310/54 |
| 2010/0127458 A1 | 5/2010 | Schubert | |
| 2017/0261107 A1 * | 9/2017 | Martin | F16J 15/3452 |

FOREIGN PATENT DOCUMENTS

| | | |
|---|---|---|
| JP | S57-130055 U | 8/1982 |
| JP | 58184366 A | 10/1983 |

OTHER PUBLICATIONS

European Search Report and Written Opinion issued in connection with corresponding EP Application No. 16150540.9 dated Jul. 26, 2016.

Office Action issued in connection with corresponding EP Application No. 16150540.9 dated Jul. 12, 2017.

\* cited by examiner

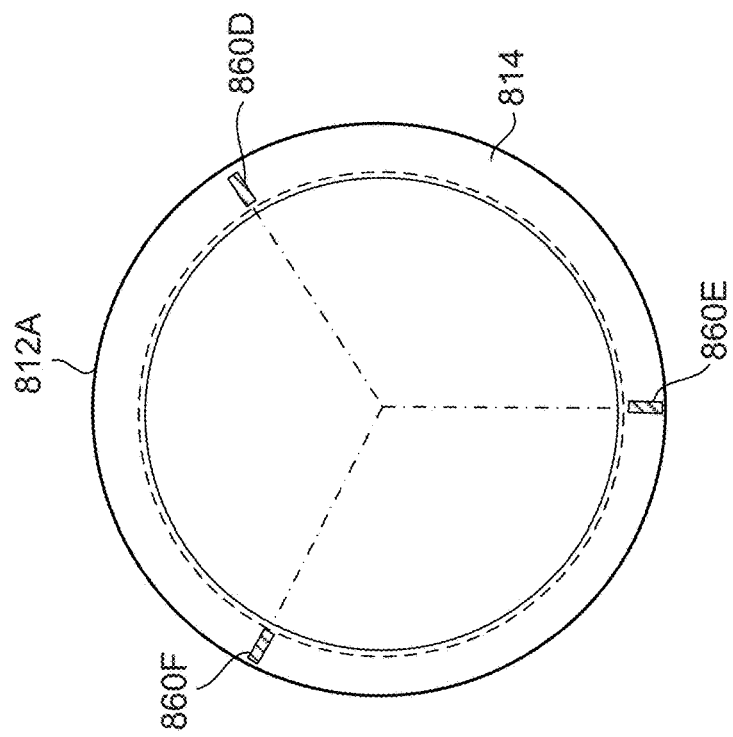
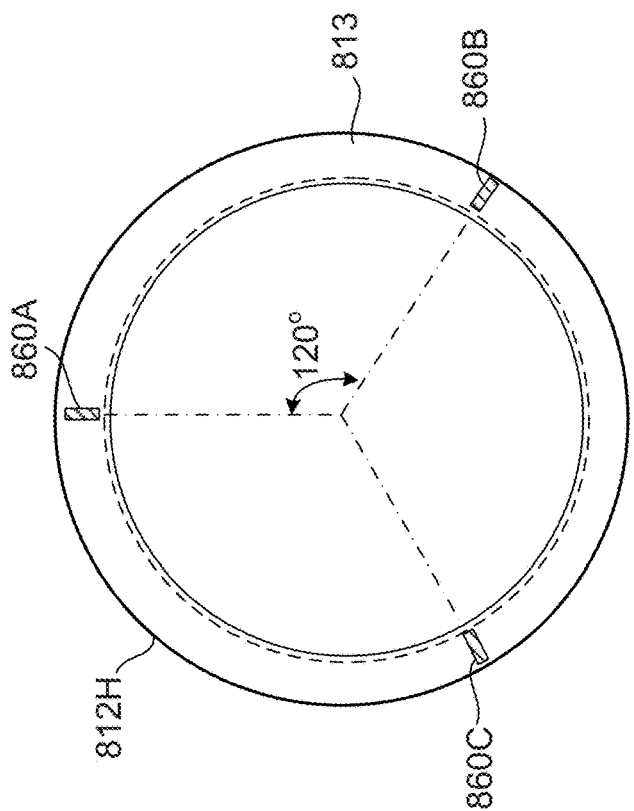
FIG. 8

SEAL RING FOR HYDROGEN COOLED GENERATOR

BACKGROUND OF THE INVENTION

The invention relates to hydrogen seal rings and, more specifically, to a seal structure for automatically resetting in the event of oil pressure loss and subsequent restoration, by reducing oil leakage through a circumferential gap between the seal ring segments and seal structure in a hydrogen cooled generator.

Hydrogen has been widely used as a coolant in a variety of rotary dynamoelectric machines, due to its desirable thermophysical properties including low density and high specific heat. However, a primary disadvantage of using hydrogen is that the hydrogen purity must be maintained above its explosive limit (74% hydrogen in air). Therefore, a primary consideration for ensuring the safe operation of hydrogen-cooled rotary machines, such as turbo-generators, is designing highly reliable and efficient hydrogen seal systems therefor.

In a hydrogen-cooled generator, hydrogen seals are utilized both to seal high-pressure hydrogen at the interface of the rotating shaft, and to prevent air from entering the casing and developing an explosive mixture with the hydrogen. Before the early 1980s, hydrogen seal systems consisted of a pair of four segmented bronze rings disposed in a seal casing. The newer babbitted steel seal rings 10 are each made in two 180° segments 12, 14 as illustrated in FIG. 1. A typical hydrogen seal system is schematically shown in FIG. 2. In that illustration, an annular seal casing is partially shown which is adapted to be mounted to a generator end shield (not shown) in surrounding and sealing relationship with a rotor/shaft 16. The casing is formed in two main parts, referred to hereinbelow as casing halves, each extending 180° about the shaft. For ease of description, the upper casing half 18 and the seal ring segments 12 disposed therein are illustrated and will be described in detail. It is to be understood, however, in an exemplary embodiment, the lower casing half has a corresponding construction. The upper casing half 18 is of two-part construction, including a seal casing main body 20 and a seal casing cap segment 22. The seal casing cap segment has a generally h-shaped cross-section, forming a radially inwardly directed chamber 24 opening in a radially inward direction towards the shaft 16 for housing radially inwardly projecting seal rings 12 which in turn engage the shaft.

Each seal casing cap segment 22 is formed with an axial portion 26 connecting an upper radial flange portion 28 and lower inner radial portion 30 and outer radial portion 32. The axial portion 26 thus defines a base for the chamber 24 while radial portions 30 and 32 form two, axially spaced, parallel sides of the chamber 24. Axially opposed shoulders 34, 36 define an opening facing the rotor shaft 16. The seal casing cap segment 22 is fastenable to the seal casing main body 20 by a semi-annular array of bolts 38 passing through holes in the radial flange portion 28 of the cap and threadably received in the main body 20.

Within the chamber 24, there are seated a pair of side-by-side seal ring segments 12, each extending approximately 180° about the casing half 18. The rings 10 are held together radially and apart axially by two coil springs 40 (only one of which is shown in FIG. 2), each extending substantially 180° within the chamber 24. The spring is seated within an area created by tapered surfaces 42 on the respective ring segments 12. Opposite ends of the spring are anchored to axially extending pins (not shown) via a hook or the like (not shown) formed at each end thereof. As is conventional, the pin is located within aligned bores in radial wall portions of the casing cap segment. The pin is also used to align and hold a labyrinth type oil seal 46. The spring biases the seal ring segments 12 radially inwardly and in axially opposite directions, against opposed faces of the inner and outer radial wall portions 30, 32 of the chamber 24.

In use, seal oil is introduced into the cavity of chamber 24 behind or radially outside the seal rings 12, at a pressure higher than the hydrogen pressure inside the casing. Then, the high pressure seal oil flows radially between the seal rings 12 toward the rotating shaft 16, where the sealing oil flow divides and runs axially with the clearance between the shaft and seal rings. At the hydrogen side 48 of the seal rings, the oil flows evenly between the shaft and the inner seal ring all the way around the seal ring at their interface and thus seals hydrogen from leaking and keeps the seal ring centered on the shaft. Similarly, the oil is uniformly distributed between the shaft 16 and the outer seal ring at the air side 50 of the seal.

As illustrated in FIG. 1, hydrogen seal rings 10 are usually made into segments 12, 14, split at horizontal joints. The two segments can either be bolted together at the horizontal joint or held by two coil springs suitably attached to the casing. As noted above, the purpose of the hydrogen seal springs 40 is to separate the two sealing rings and keep the sides of the rings against the casing. In normal operation, these rings maintain a uniform clearance and do not allow oil leakage at the ring segment joints. They are free to expand radially but prevented from rotating by either the pins to which the springs are attached or an anti-rotation device. In this way, the rings can float freely with respect to the seal casing cap 22.

However, under certain circumstances, the seal rings 12 may stick together so that oil ceases to flow between the seal rings. One possible cause is a loss in seal oil pressure. If the seal oil pressure drops to an undesirably low level the inner seal oil ring may move towards the outer seal ring until their axial surfaces make contact. This blocks the oil flow channel and the seal rings can be resistant to separating due to static friction between the two axial surfaces. Another problem is that when both seal rings contact each other in this manner, a large channel is opened up between the shoulder 34 and the opposing surface of the seal ring 12. This channel can allow oil to flow into the generator in undesirable quantities and possibly result in a forced shutdown of the generator.

BRIEF DESCRIPTION OF THE INVENTION

In an aspect of the present invention, a seal ring assembly includes a seal casing defining a radially inwardly directed channel. A first seal ring is axially disposed from a second seal ring. The first seal ring has a first axial face opposing a second axial face of the second seal ring. A radial oil channel is defined between the first axial face and the second axial face. Both the first seal ring and the second seal ring have a tapered surface configured to contact a spring, and this is spring configured to bias the first seal ring away from the second seal ring via the tapered surface. The first seal ring and the second seal ring are disposed in the radially inwardly directed channel. At least one of the first seal ring or the second seal ring have a plurality of protrusions that extend beyond the first axial face or the second axial face. The plurality of protrusions are configured to create a passageway to allow oil to flow through the passageway and to allow at least one of the first seal ring or the second seal ring to move into a desired position by reducing static friction between the first axial face and the second axial face.

In another aspect of the present invention, a seal ring assembly includes a seal casing defining a radially inwardly directed channel, and a first seal ring axially disposed from a second seal ring. The first seal ring has a first axial face opposing a second axial face of the second seal ring. A radial oil channel is defined between the first axial face and the second axial face. Both the first seal ring and the second seal ring have a tapered surface configured to contact a spring, and the spring is configured to bias the first seal ring away from the second seal ring via the tapered surface. The first seal ring and the second seal ring are disposed in the radially inwardly directed channel. At least one of the first seal ring or the second seal ring have a plurality of protrusions that extend beyond the first axial face or the second axial face. The plurality of protrusions are configured to create a passageway to allow oil to flow through the passageway and to allow at least one of the first seal ring or the second seal ring to move into a desired position by reducing static friction between the first axial face and the second axial face. The plurality of protrusions extend about one third to about one half of the way into the radial oil channel. Both the first seal ring and the second seal ring comprise a wearable material located at an inner radial position thereof, and the wearable material is configured to reduce wear on a rotor shaft.

BRIEF DESCRIPTION OF THE DRAWINGS

FIG. 8 illustrates an axial end view of both the hydrogen side seal ring and the air side seal ring, according to an aspect of the present invention.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related and system-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," and "the" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

Figure 1:
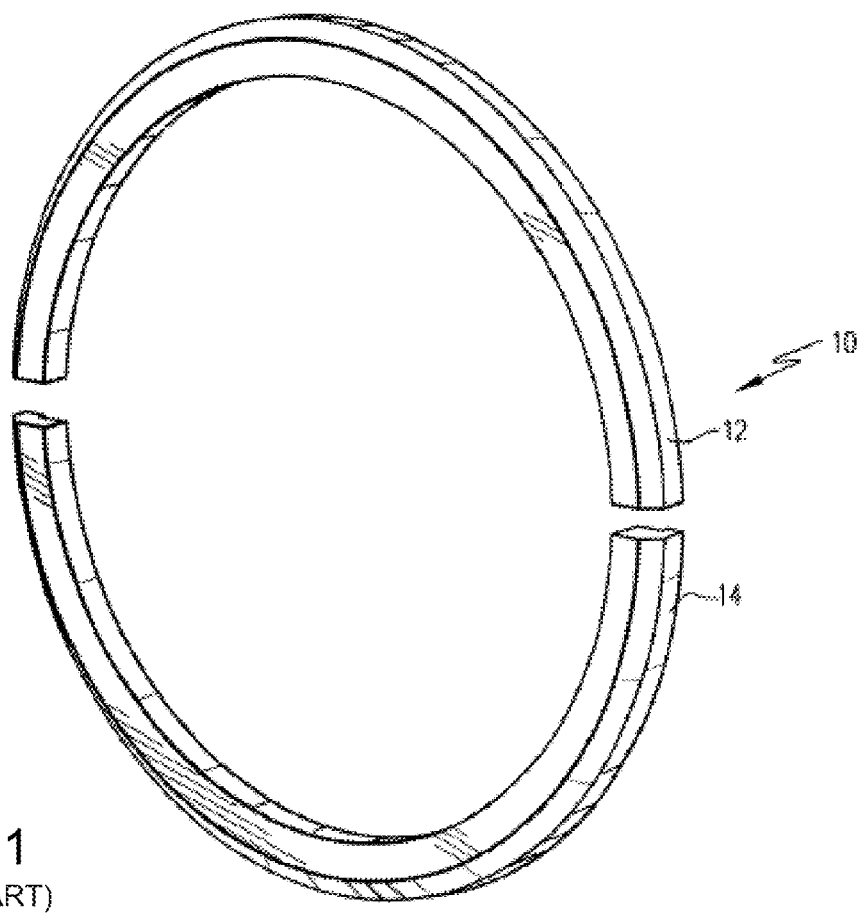
FIG. 1 illustrates a perspective view of one known seal ring.
Figure 2:
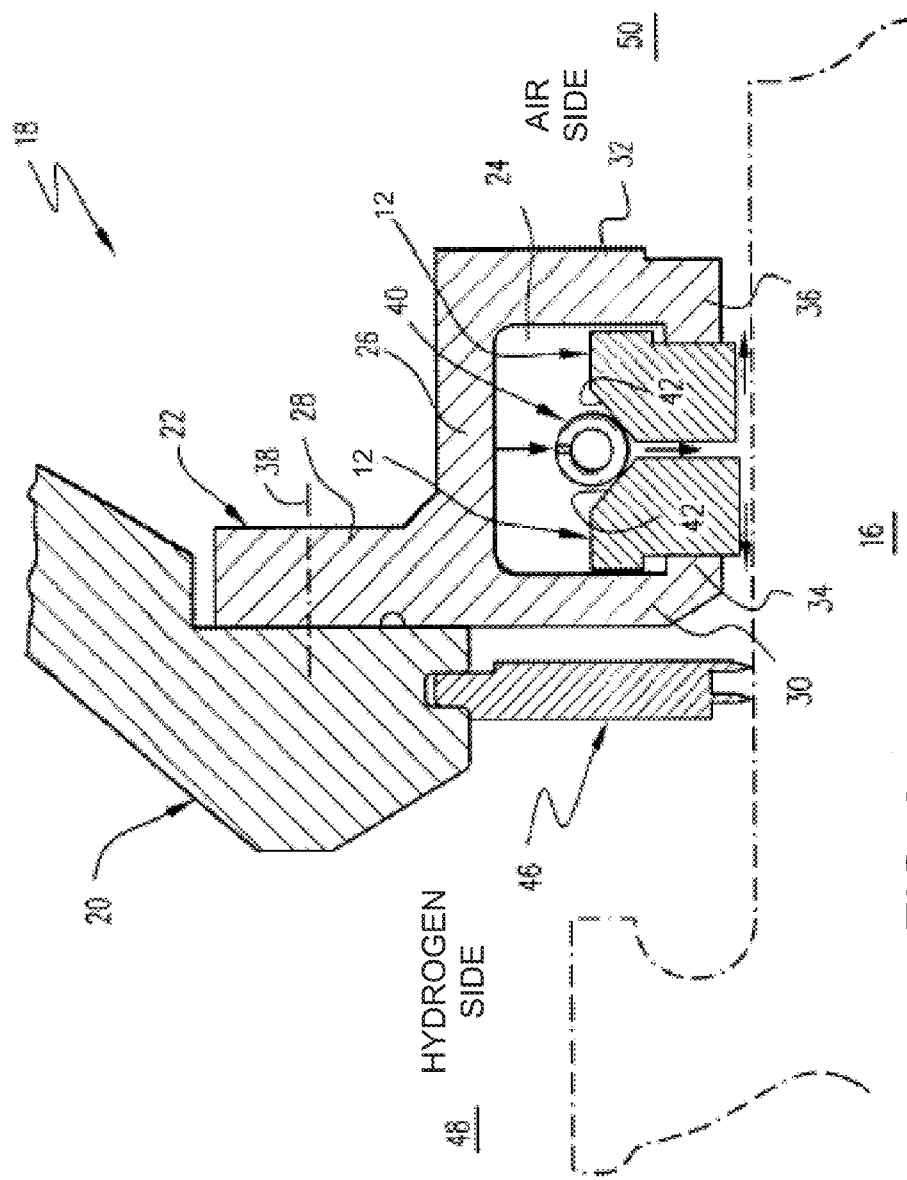
FIG. 2 illustrates a partial, cross-sectional view of a known seal assembly.
Figure 3:
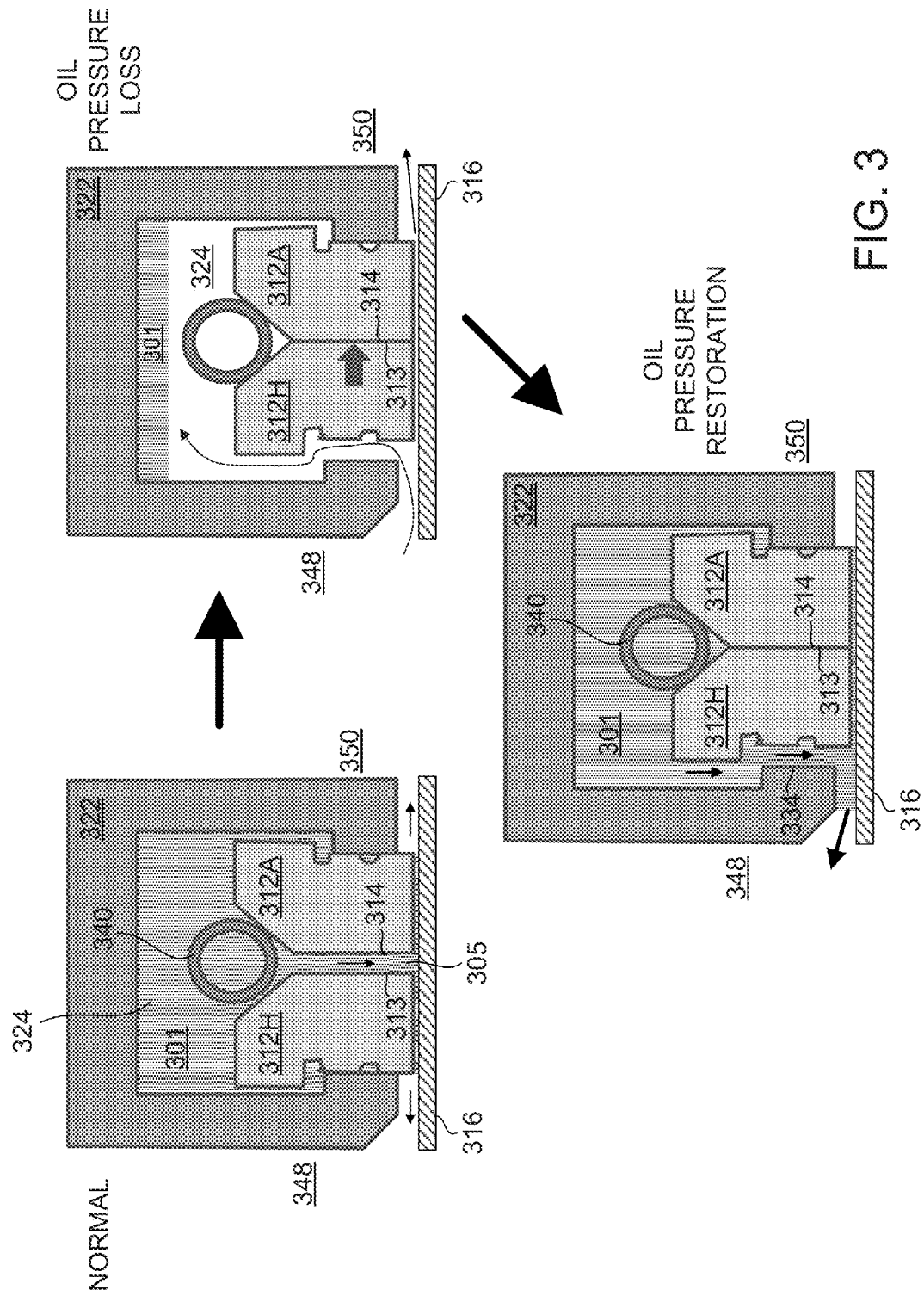
FIG. 3 illustrates a sequence of events that lead to oil ingress into the hydrogen cooled generator.

FIG. 3 illustrates a sequence of events that lead to oil ingress into the hydrogen cooled generator. The upper left portion of FIG. 3 shows the seal assembly in its normal and desired operating state. The seal casing 322 has a chamber 324 that is filled with oil 301, and this oil passes through the spring 340 and into the radial oil channel 305 (i.e., between axial faces 313, 314 of the seal rings). The oil 301 then travels between the rotor shaft 316 and the seal rings 312H and 312A. The seal ring 312H is on the hydrogen side 348 of the seal assembly, and the seal ring 312A is on the air side 350 of the seal assembly. For example, the hydrogen side 348 is internal to the hydrogen cooled generator and is under a higher pressure compared to the external air side 350.

It is possible to experience a loss of oil pressure and the upper right portion of FIG. 3 illustrates this occurrence. The loss of oil pressure results in a net loss of force on the two seal rings 312H, 312A, and because of this the two seal rings contact each other along their axial faces 313, 314. In the normal operating mode previously described, the oil passing between axial faces 313, 314 acts on and helps to keep the axial faces away from each other. In an oil pressure loss event, this repulsing force is lost and the force of the spring is not enough to maintain separation of the axial faces 313, 314. The greater pressure of the hydrogen gas inside the generator overcomes the spring 340 and forces the hydrogen side seal ring 312H over until axial face 313 contacts axial face 314. The radial oil channel 305 now ceases to exist. In addition, hydrogen gas also flows into chamber 324 as well as externally to air side 350. When the two axial faces 313, 314 contact each other they become difficult to separate due to the forces of static friction (or stiction). The force of the spring 340 is insufficient to move the seal rings 312H and/or 312A back into the desired position.

The bottom center portion of FIG. 3 illustrates when seal oil pressure is restored. As the seal oil pressure is restored oil 301 refills chamber 324, but the radial oil channel 305 is completely blocked due to the two tightly bound axial faces 313, 314. In this instance the oil 301 flows through the relatively large gap between the seal ring 312H and the shoulder 334 of the seal casing 322. This results in a large amount of oil flooding the generator and subsequently into a forced/automatic shutdown. The problem encountered here is that the seal rings 312H, 312A cannot automatically reset to their desired positions during an oil pressure loss and subsequent oil pressure restoration event.

Figure 4:
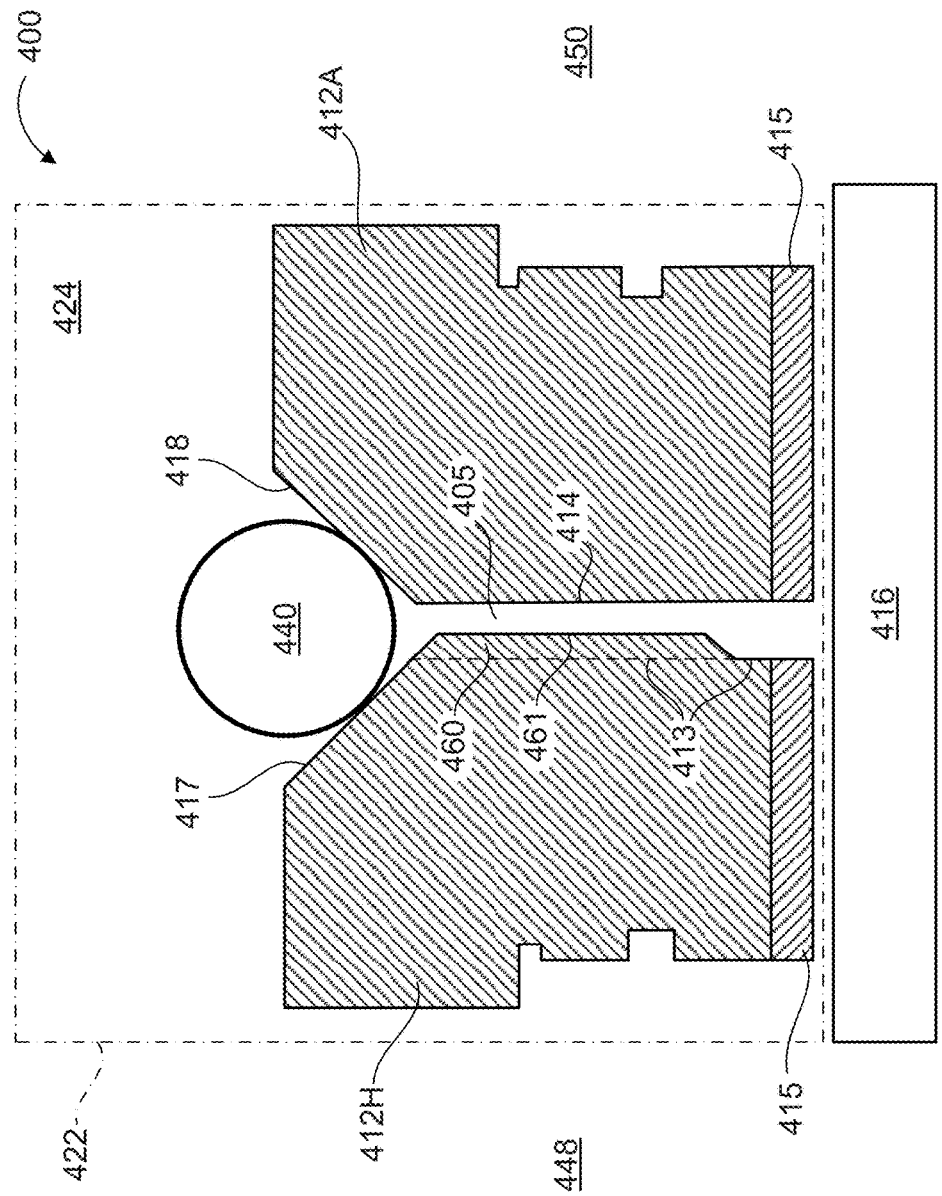
FIG. 4 illustrates a seal ring assembly, according to an aspect of the present invention.

FIG. 4 illustrates a seal ring assembly 400, according to an aspect of the present invention. The seal ring assembly includes a seal casing 422 having a chamber 424 that contains oil under pressure. The oil (not shown for clarity) flows through a spring 440 and a radial oil channel 405. The radial oil channel 405 is defined by the space between an axial face 413 of a hydrogen side seal ring 412H and the axial face 414 of the air side seal ring 412A. Each of the seal rings 412H and 412A include a tapered surface 416, 417 configured to contact spring 440. The tapered surfaces 417, 418 in conjunction with spring 440 impart both axial and radial forces on the seal rings 412H, 412A. Wearable materials 415 are located on the radially inward portion of both seal rings and are made of a relatively softer material than the seal rings to reduce damage to rotor shaft 416. For example, wearable material 415 may be made of babbitt alloy, bronze or any other suitable material. The hydrogen side 448 of the seal is located on the left and the air side 450 is located on the right of FIG. 4.

The seal ring 412H includes a plurality of protrusions 460 that extend beyond the axial face 413. For example, about six protrusions 460 may be distributed circumferentially about the axial face 413 so that each protrusion is spaced about 60 degrees away from a neighboring protrusion. In this example, the protrusions 460 are configured to extend about one third to about one half of the way into channel 405. In the event of an oil pressure loss and movement of axial face 413 towards axial face 414, this will allow for a satisfactory channel 405 to still exist between the two axial faces 413, 414. As one specific example, the axial length of the radial oil channel 405 may be about 0.125 inches, and the axial length of the protrusions may be about 0.04 inches to about 0.06 inches. Even when the protrusions contact axial face 414, channel 405 will still have an axial length of about 0.06 to 0.08 inches. These dimensions are only one example, and it is to be understood that any suitable combination of dimensions may be employed. The axial length of the protrusions may be less than one third of the channel length or more than half of the channel length. For example, the length of the protrusion may span up to the axial length of the channel less a small amount for axial thermal expansion allowance. This distance will be more than adequate to maintain oil flow along the channel 405 in the normal operating mode, and quickly restore separating oil pressure and flow to the axial faces 413, 414 of the seal rings, as well as greatly minimizing or reducing any problems due to static friction (stiction), following an oil pressure loss event. The circumferential width of the protrusions may be about 0.25 inches, while the radial length may be about 0.75 inches. This results in a very small surface area comprising the axial face 461 of the protrusions when compared to the surface area of the axial face 414 of the seal ring 412A. In fact, the resulting static friction forces are so small that the combination of the spring 440 and oil flow through channel 405 are more than adequate to return the seal rings 412H, 412A back to their normal operating positions without having undesired oil leaks into the inside of the hydrogen cooled generator.

Figure 5:
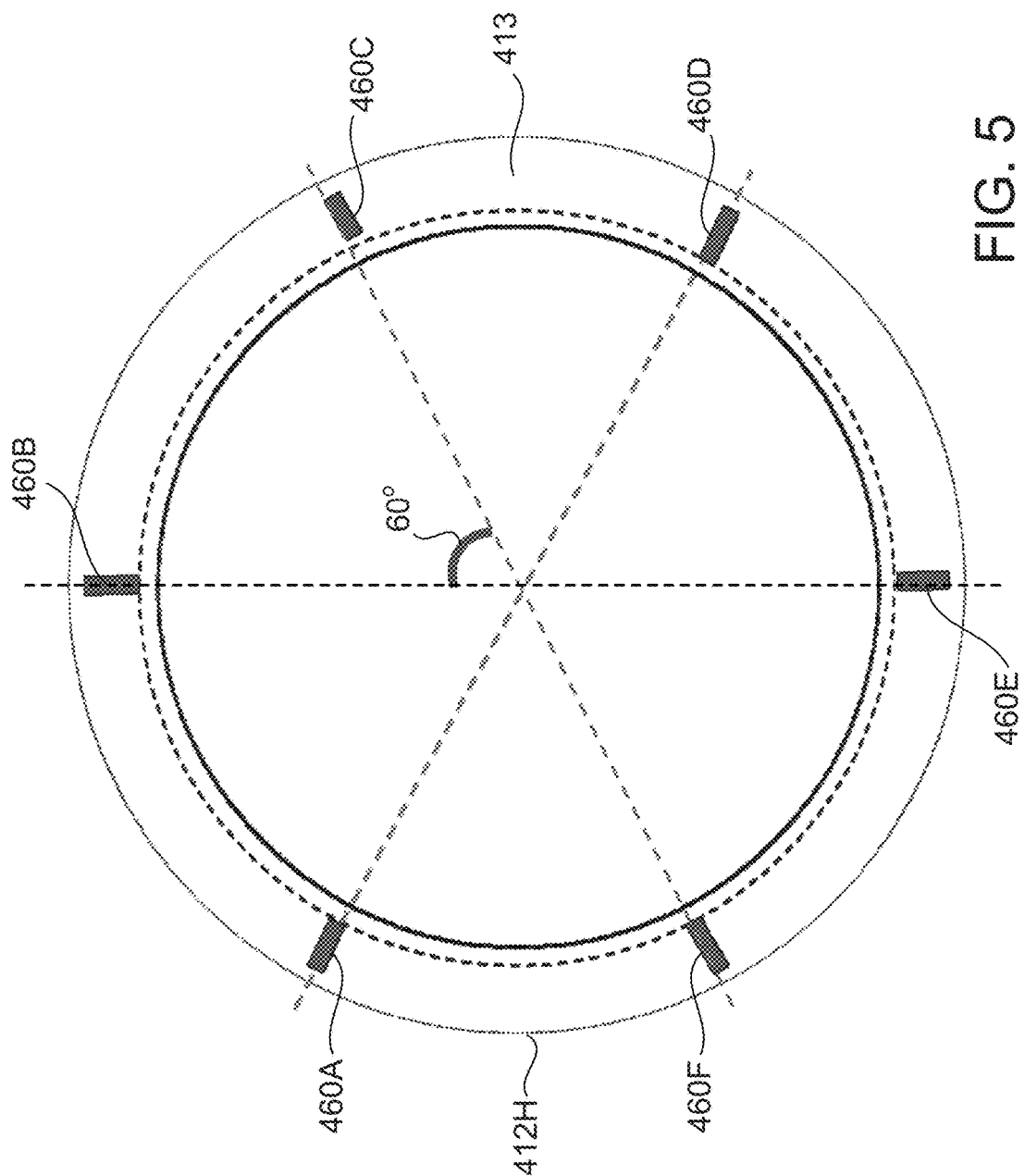
FIG. 5 illustrates and axial end view of the hydrogen side seal ring as shown in FIG. 4, according to an aspect of the present invention.

FIG. 5 illustrates and axial end view of the hydrogen side seal ring 412H as shown in FIG. 4, according to an aspect of the present invention. The seal ring 412H is comprised of two halves, an upper half and a lower half. The upper half includes protrusions 460A, 460B and 460C, each of which are spaced about 60 degrees from a neighboring protrusion. The lower half of the seal ring includes protrusions 460D, 460E and 460F, each of which are spaced about 60 degrees from a neighboring protrusion. In this example, six protrusions are generally equally spaced around the axial face 413 of the seal ring 412H. However, it is to be understood that more or less than six protrusions 460 may be employed. It will be apparent that the surface area of the axial faces 461 of the protrusions 460 are very small when compared to the surface area of axial faces 413 and 414. This "reduced footprint" greatly reduces static friction between the two seal rings 412H, 412A and enables the seal rings to automatically reset in an oil pressure loss/restoration scenario.

Figure 6:
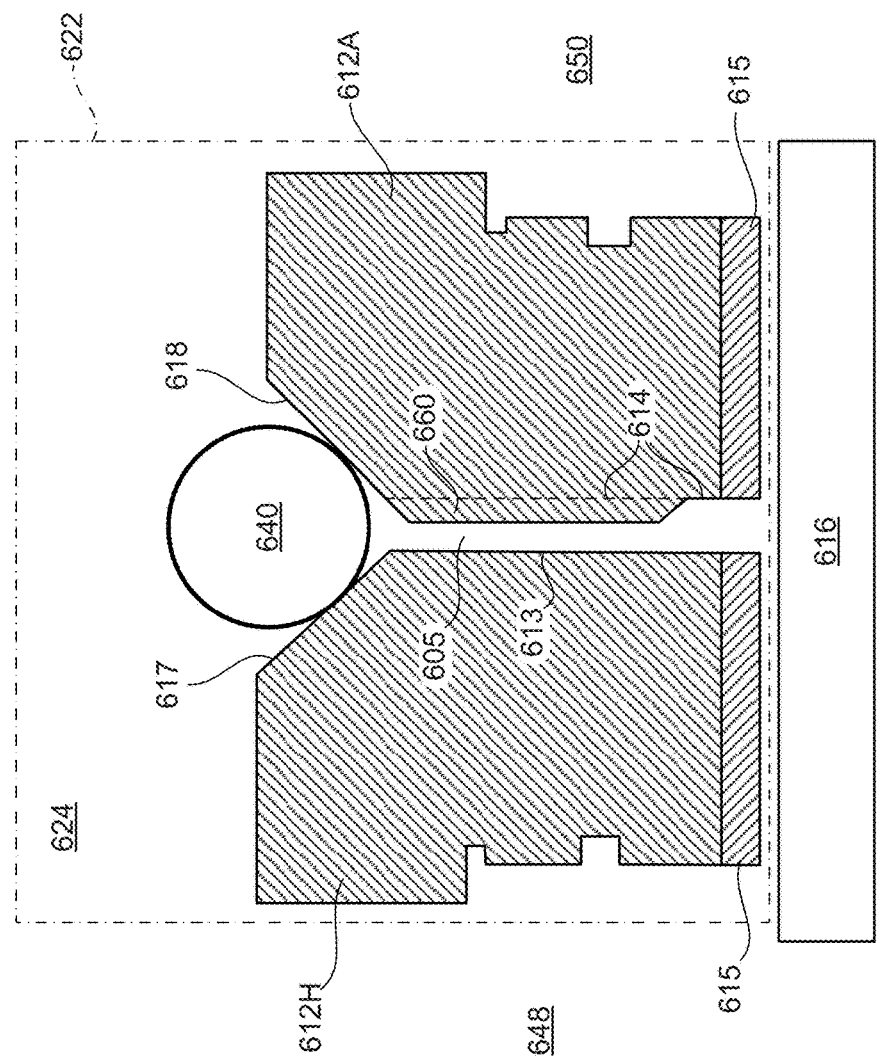
FIG. 6 illustrates a seal ring assembly, according to an aspect of the present invention.

FIG. 6 illustrates a seal ring assembly, according to an aspect of the present invention. The protrusions 660 are located on the air side seal ring 612A. The seal ring assembly includes a seal casing 622 having a chamber 624 that contains oil under pressure. The oil flows around and through a spring 640 and a radial oil channel 605. The radial oil channel 605 is defined by the space between an axial face 613 of a hydrogen side seal ring 612H and the axial face 614 of the air side seal ring 612A. Each of the seal rings 612H and 612A include a tapered surface 616, 617 configured to contact spring 640. Wearable materials 615 are located on the radially inward portion of both seal rings and are made of a relatively softer material than the seal rings to reduce damage to rotor shaft 616. The hydrogen side 648 of the seal is located on the left and the air side 650 is located on the right of FIG. 6.

Figure 7:
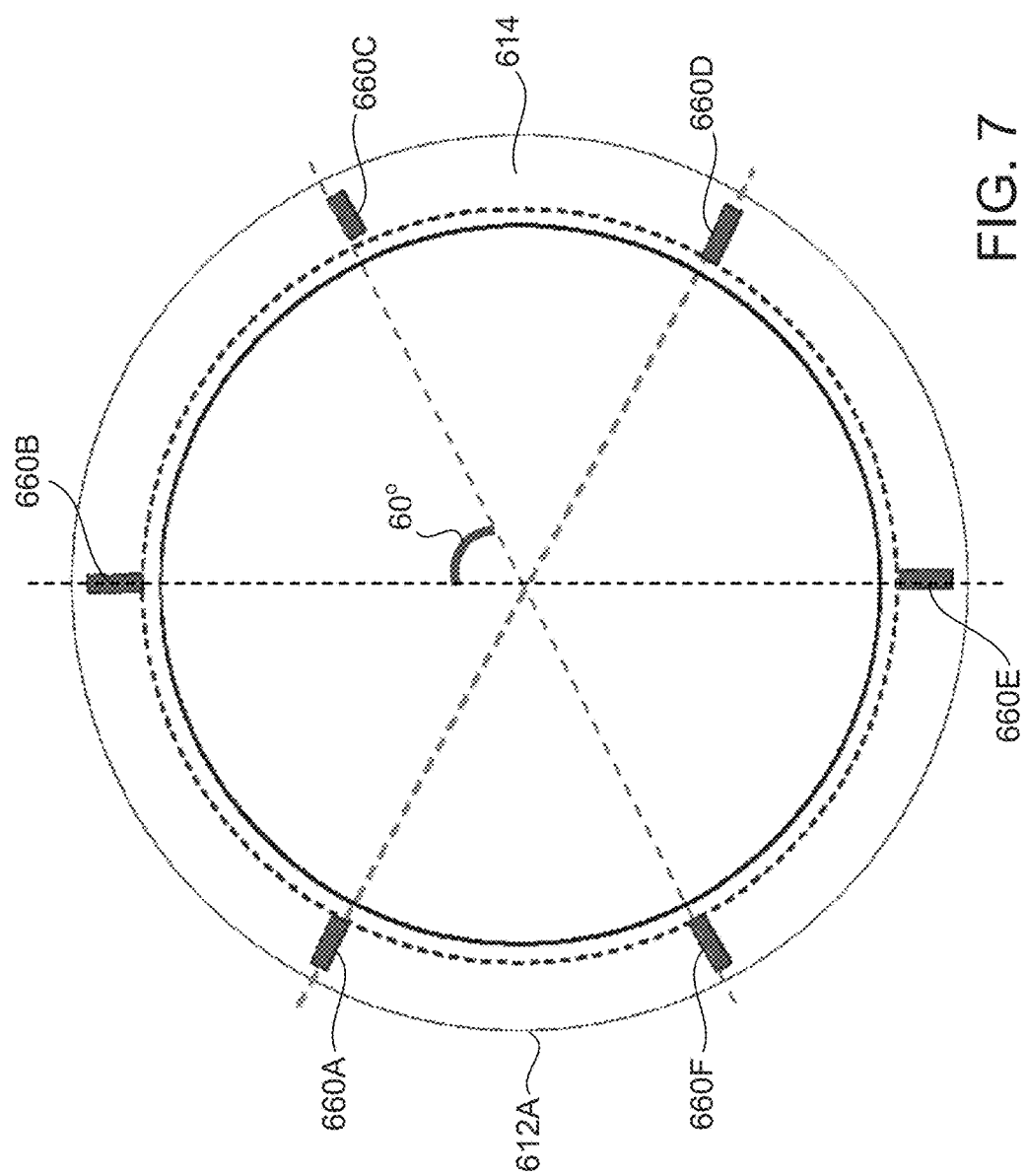
FIG. 7 illustrates an axial end view of the air side seal ring as shown in FIG. 6, according to an aspect of the present invention.

FIG. 7 illustrates an axial end view of the air side seal ring 612A as shown in FIG. 6, according to an aspect of the present invention. The seal ring 612A is comprised of two halves, an upper half and a lower half. The upper half includes protrusions 660A, 660B and 660C, each of which are spaced about 60 degrees from a neighboring protrusion. The lower half of the seal ring includes protrusions 660D, 660E and 660F, each of which are spaced about 60 degrees from a neighboring protrusion. In this example, six protrusions are generally equally spaced around the axial face 614 of the seal ring 612A. However, it is to be understood that more or less than six protrusions may be employed.

FIG. 8 illustrates an axial end view of both hydrogen side seal ring 812H and air side seal ring 812A, according to an aspect of the present invention. The hydrogen side seal ring 812H includes protrusions 860A, 860B and 860C, each of which are spaced about 120 degrees from a neighboring protrusion on the same seal ring. The air side seal ring 812A includes protrusions 860D, 860E and 860F, each of which are spaced about 120 degrees from a neighboring protrusion. In this example, three protrusions are generally equally spaced around the axial face 813 of the seal ring 812H and the axial face 814 of seal ring 812A. The protrusions on the hydrogen side seal ring 812H are offset from the protrusions on the air side seal ring 812A. As other examples, each ring could have 2 protrusions spaced 180 degrees apart, or 4 protrusions spaced 90 degrees apart. However, it is to be understood that more or less than six protrusions may be employed, as desired in the specific application. When arranged side by side so that the two axial faces 813 and 814 face each other, the protrusions are spaced about 60 degrees away from each other.

Figure 9:
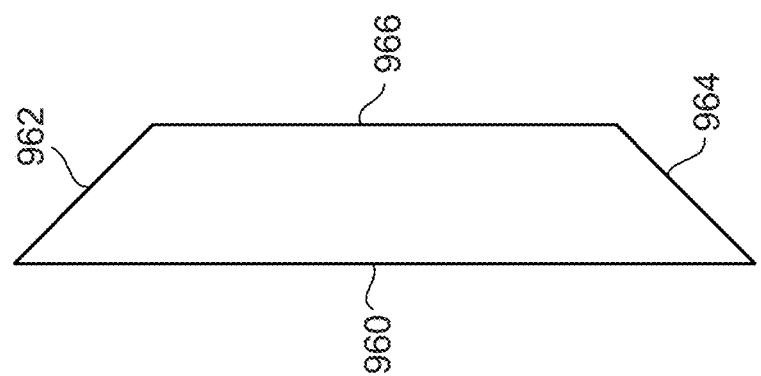
FIG. 9 illustrates a side view of a single protrusion, according to an aspect of the present invention.

FIG. 9 illustrates a side view of a single protrusion 960, according to an aspect of the present invention. The protrusion 960 may be integrally formed with the seal ring or attached to the seal ring. The protrusion includes two ramped surfaces 962, 964 located near the beginning and the end of the radial oil channel. Ramped surface 962 is located at a radially outward location and ramped surface 964 is located at a radially inward location. The ramped surfaces facilitate oil flow past the protrusions during normal operation (i.e., no oil pressure loss event). An axial face 966 of the protrusion has a reduced surface area due to the existence of the ramped surfaces 962, 964.

Figure 10:
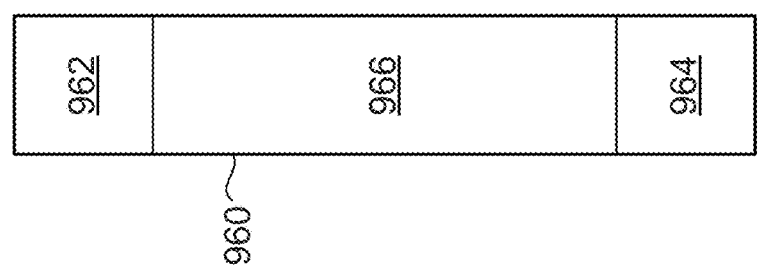
FIG. 10 illustrates a front view of the protrusion as shown in FIG. 9.

FIG. 10 illustrates a front view of the protrusion 960 shown in FIG. 9. This view is rotated 90 degrees with respect to FIG. 9. As shown, the protrusion 960 has a generally rectangular footprint. The axial face 966 that may contact the opposing axial face of the other seal ring has a reduced contact/surface area due to the ramped surfaces 962, 964.

Figure 11:
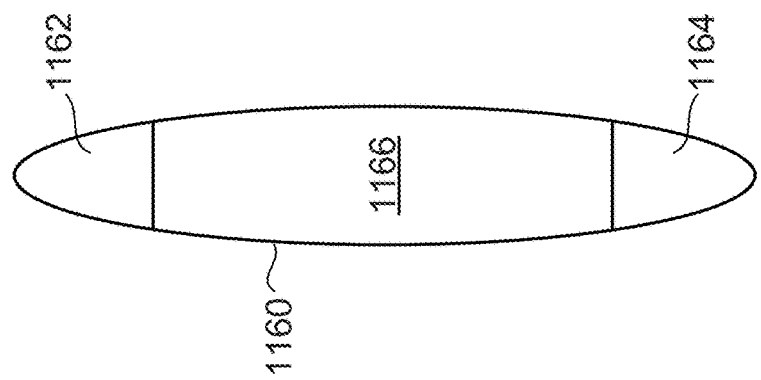
FIG. 11 illustrates a front view of a single protrusion, according to an aspect of the present invention.

FIG. 11 illustrates a front view of a single protrusion 1160, according to an aspect of the present invention. The protrusion 1160 has a generally oval footprint for further oil flow enhancement. The protrusion 1160 includes two ramped surfaces 1162, 1164 located near the beginning and the end of the radial oil channel. Ramped surface 1162 is located at a radially outward location and ramped surface 1164 is located at a radially inward location. The ramped and tapered surfaces facilitate the flow of oil past the protrusions during normal operation (i.e., no oil pressure loss event). The axial face 1166 of the protrusion has a further reduced surface area due to the oval shape of the protrusion.

Figure 13:
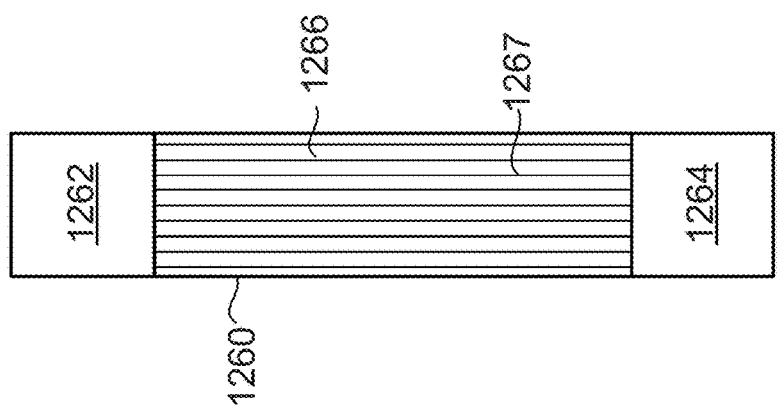
FIG. 13 illustrates a front view of the protrusion as shown in FIG. 12.
Figure 12:
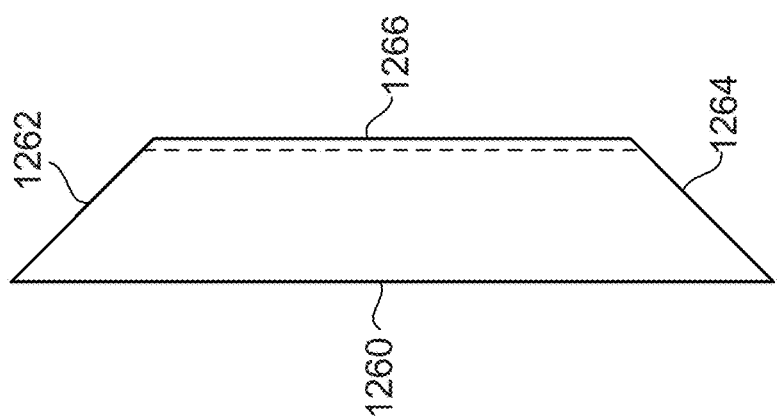
FIG. 12 illustrates a side view of a single protrusion, according to an aspect of the present invention.

FIG. 12 illustrates a side view of a single protrusion 1260, according to an aspect of the present invention. FIG. 13 illustrates a front view (rotated 90 degrees with respect to FIG. 12) of the protrusion 1260. The protrusion 1260 includes two ramped surfaces 1262, 1264 located near the beginning and the end of the radial oil channel. Ramped surface 1262 is located at a radially outward location and ramped surface 1264 is located at a radially inward location. The axial face 1266 of the protrusion includes a plurality of corrugations (or ribs) 1267, and these further reduce the surface area of the axial face 1266. It is to be understood that the pattern of the corrugations (or ribs) could have different orientations (e.g., angled by 30 degrees, 45 degrees, etc.), or the axial face 1266 could have a dimpled surface, a surface with multiple protrusions (e.g., hemispherical protrusions), or elements of any shape that decrease static friction between the seal rings and/or increase turbulence of oil passing through the radial oil channel.

Figure 14:
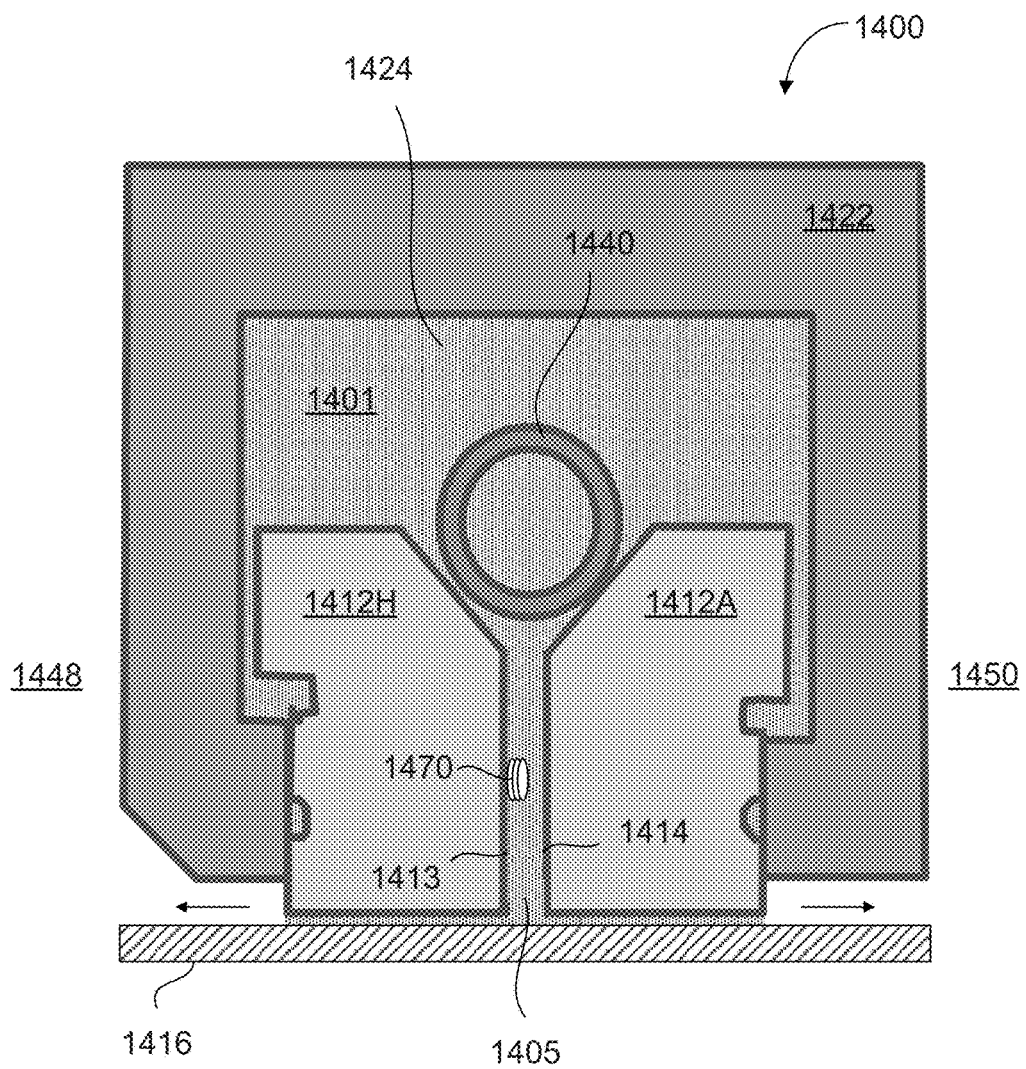
FIG. 14 illustrates a partial view of a seal assembly, according to an aspect of the present invention.

FIG. 14 illustrates a partial view of a seal assembly 1400, according to an aspect of the present invention. The seal casing 1422 has a chamber 1424 that is filled with oil 1401, and this oil passes through the spring 1440 and into the radial oil channel 1405 (i.e., between axial faces 1413, 1414 of the seal rings). The oil 1401 then travels between the rotor shaft 1416 and the seal rings 1412H and 1412A. The seal ring 1412H is on the hydrogen side 1448 of the seal assembly, and the seal ring 1412A is on the air side 1450 of the seal assembly. A plurality of seal ring springs 1470 may be provided on one or both of the seal rings 1412H, A. The seal ring spring 1470 is configured to exert a force to push the axial face 1413 away from the axial face 1414, and when fully compressed, will retain an axial gap in the flow channel 1405 of sufficient length to allow oil flow restoration following an oil pressure loss event. The spring 1470 may be comprised of a coil spring, a leaf spring or any other suitable spring. Similar to the protrusions previously described, the springs 1470 may be distributed about the seal ring(s) in a generally equal circumferential spacing.

Figure 15:
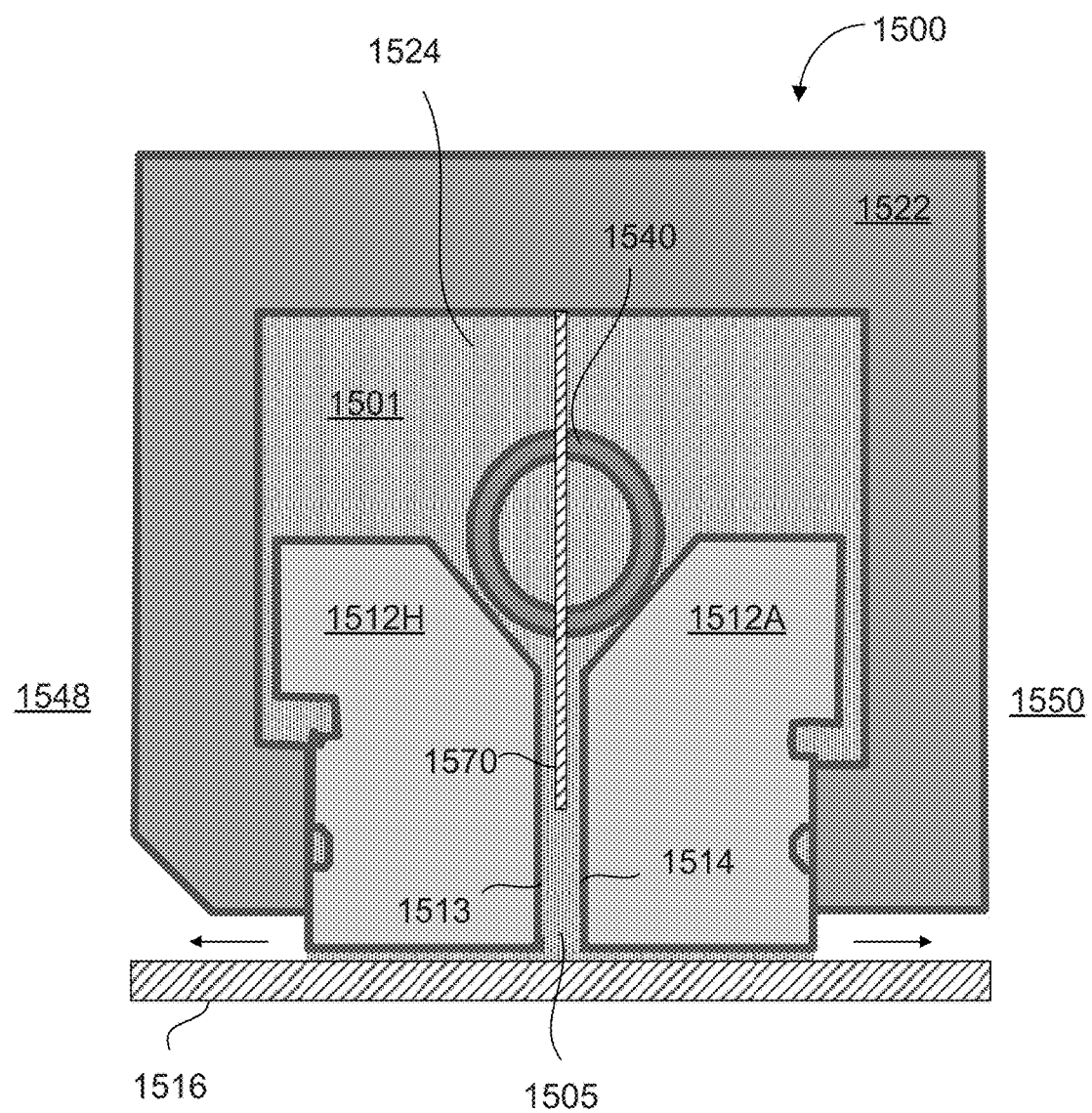
FIG. 15 illustrates a partial view of a seal assembly, according to an aspect of the present invention.

FIG. 15 illustrates a partial view of a seal assembly 1500, according to an aspect of the present invention. The seal casing 1522 has a chamber 1524 that is filled with oil 1501, and this oil passes through the spring 1540 and into the radial oil channel 1505 (i.e., between axial faces 1513, 1514 of the seal rings). The oil 1501 then travels between the rotor shaft 1516 and the seal rings 1512H and 1512A. The seal ring 1512H is on the hydrogen side 1548 of the seal assembly, and the seal ring 1512A is on the air side 1550 of the seal assembly. A distance separator 1570 extends radially inward from the seal casing 1522 into the radial oil channel 1505. The distance separator 1570 prevents the two axial faces 1513, 1514 from contacting each other. The distance separator 1570 may be comprised of stainless steel, metal alloys or any other suitable material. Similar to the protrusions previously described, the distance separators 1570 may be distributed about the casing 1522 and between the seal ring(s) in a generally equal circumferential spacing.

Figure 16:
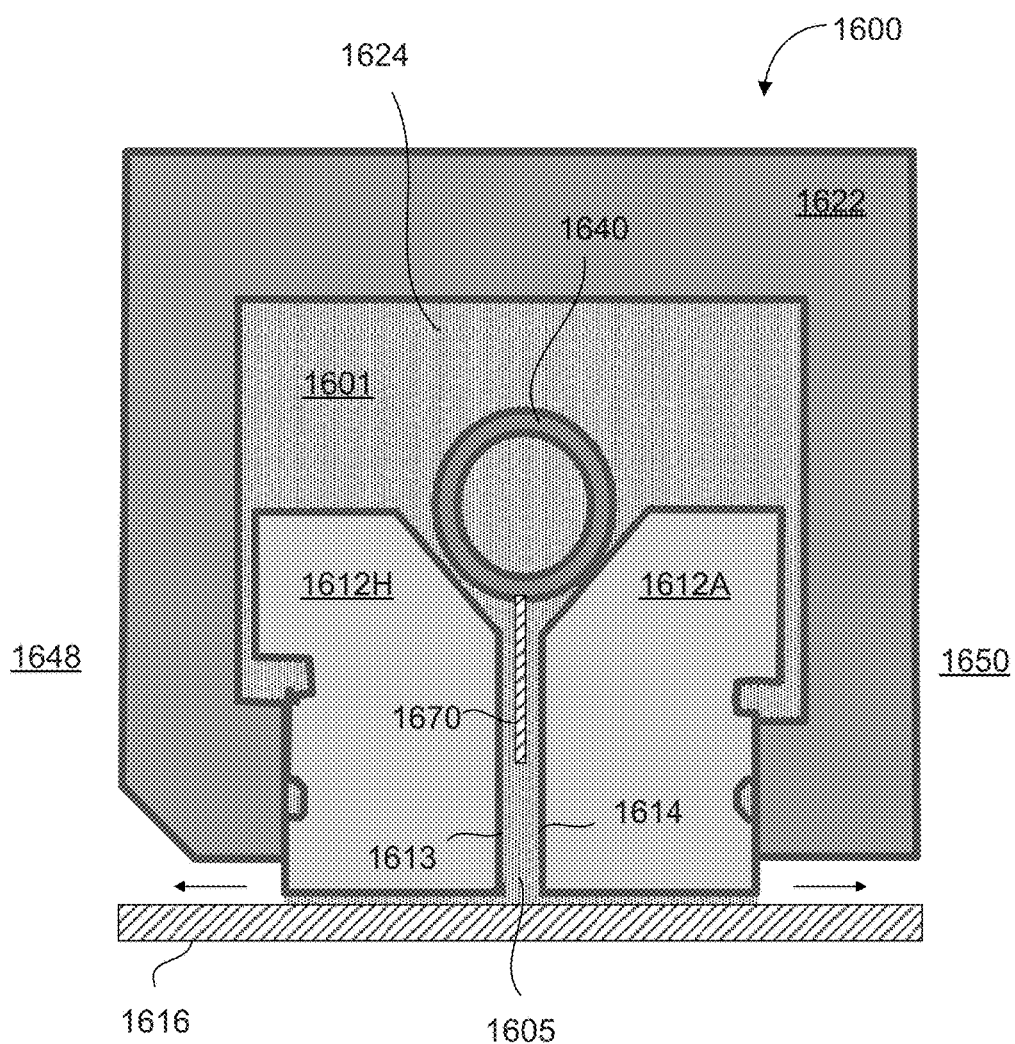
FIG. 16 illustrates a partial view of a seal assembly, according to an aspect of the present invention.

FIG. 16 illustrates a partial view of a seal assembly 1600, according to an aspect of the present invention. The seal casing 1622 has a chamber 1624 that is filled with oil 1601, and this oil passes through the spring 1640 and into the radial oil channel 1605 (i.e., between axial faces 1613, 1614 of the seal rings). The oil 1601 then travels between the rotor shaft 1616 and the seal rings 1612H and 1612A. The seal ring 1612H is on the hydrogen side 1648 of the seal assembly, and the seal ring 1612A is on the air side 1650 of the seal assembly. A distance separator 1670 extends radially inward from the spring 1640 into the radial oil channel 1605, and may be integrally formed with the spring 1640 or attached thereto in any suitable manner (e.g., welding, mechanical fasteners, adhesives, etc.). The distance separator 1670 prevents the two axial faces 1613, 1614 from contacting each other. The distance separator 1670 may be comprised of stainless steel, metal alloys or any other suitable material. Similar to the protrusions previously described, the distance separators 1670 may be distributed around the spring 1640 and between the seal ring(s) in a generally equal circumferential spacing.

Figure 18:
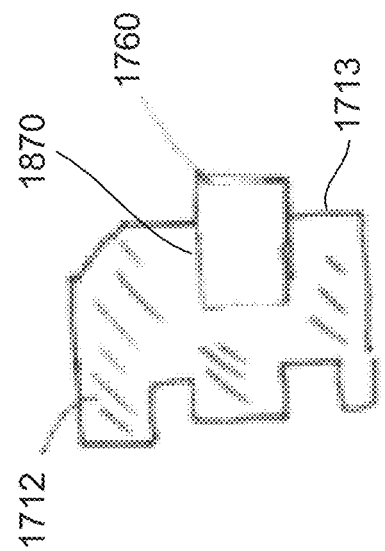
FIG. 18 illustrates a cross-sectional view of the seal ring and the protrusion as shown in FIG. 17, according to an aspect of the present invention.
Figure 17:
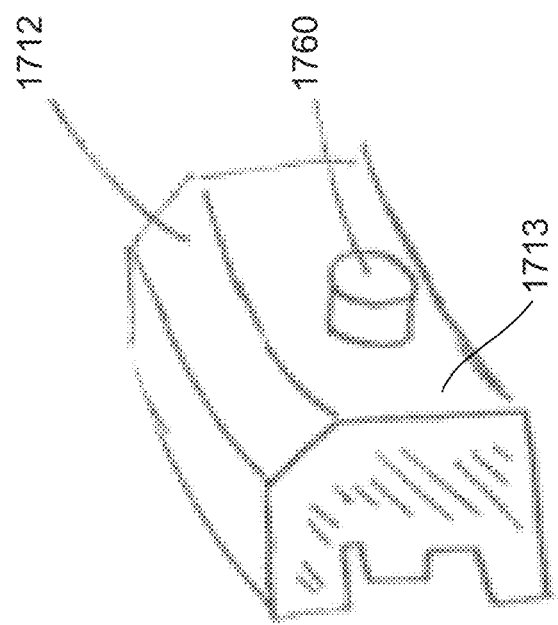
FIG. 17 illustrates a partial perspective view of a seal ring and a protrusion, according to an aspect of the present invention.

FIG. 17 illustrates a partial perspective view of a seal ring 1712 and a protrusion 1760. FIG. 18 illustrates a cross-sectional view of the seal ring 1712 and the protrusion 1760. The seal ring 1712 may include a plurality of cylindrical protrusions 1760 (i.e., having a substantially circular cross-sectional shape). The protrusions 1760 may be inserted or attached to the axial face 1713 by drilling a hole 1870 into the axial face 1713 of the seal ring 1712. The protrusion 1760 can be inserted into the hole 1870 and held in place by an interference fit, adhesive, welding or any other suitable fastening system or process. As an additional example, the hole 1870 may be internally threaded and a portion of the protrusion 1760 can be externally threaded, and in this manner the protrusion can be screwed into and retained by the hole 1870. The protrusion 1760 could be formed by any suitable shape, including but not limited to cross-sections that are rectangular, triangular, polygonal, circular or oval. An advantage to the circular/cylindrical protrusions 1760 is that they present a small to operationally insignificant obstruction to oil flowing through the radial channel, and they have a minimal axial area thereby reducing static friction (stiction) between the axial faces of the seal rings.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A seal ring assembly comprising:
 a seal casing defining a radially inwardly directed channel;
 a first seal ring axially disposed from a second seal ring, the first seal ring having a first axial face opposing a second axial face of the second seal ring, a radial oil channel defined between the first axial face and the second axial face, both the first seal ring and the second seal ring comprising a radially outer tapered surface configured to contact a spring one of the first and second seal rings comprising a radially inner tapered surface, the spring configured to bias the first seal ring away from the second seal ring via the radially outer tapered surfaces, the radially outer tapered surfaces and the radially inner tapered surface configured to facilitate oil flow past both the radially outer tapered surfaces and the radially inner tapered surface, the first seal ring and the second seal ring disposed in the radially inwardly directed channel;
 at least one of the first seal ring or the second seal ring comprising a plurality of evenly spaced protrusions that extend beyond the first axial face or the second axial face, wherein each of the protrusions has an axially facing surface, wherein the radially inner tapered surface is the bottommost surface of at least one of the protrusions, wherein the combined surface area of the axial facing surfaces is less than half of the surface area of the rest of the first or second axial face of the one of the first or second seal rings, and wherein the plurality of protrusions are configured to create a passageway to allow oil to flow through the passageway and to allow at least one of the first seal ring or the second seal ring to move by reducing static friction between the first axial face and the second axial face.

2. The seal ring assembly of claim 1, wherein the plurality of protrusions extend about one third to about one half of the way into the radial oil channel.

3. The seal ring assembly of claim 2, wherein an axial length of the radial oil channel is about 0.125 inches and an axial length of the plurality of protrusions are about 0.04 inches to about 0.06 inches.

4. The seal ring assembly of claim 1, wherein the plurality of protrusions are disposed at substantially equal intervals along at least one of the first axial face or the second axial face.

5. The seal ring assembly of claim 1, wherein the plurality of protrusions are disposed on the first axial face.

6. The seal ring assembly of claim 5, wherein the plurality of protrusions are disposed at about 60 degree intervals along the first axial face.

7. The seal ring assembly of claim 1, wherein the plurality of protrusions are disposed on the second axial face.

8. The seal ring assembly of claim 7, wherein the plurality of protrusions are disposed at about 60 degree intervals along the second axial face.

9. The seal ring assembly of claim 1, wherein the plurality of protrusions are disposed at substantially equal intervals along both the first axial face and the second axial face.

10. The seal ring assembly of claim 9, wherein each protrusion of the plurality of protrusions are disposed at about 120 degree intervals along the first axial face and the second axial face, and protrusions on the first axial face are offset about 60 degrees from protrusions on the second axial face.

11. The seal ring assembly of claim 1, wherein each of the plurality of protrusions has a generally oval shaped footprint.

12. The seal ring assembly of claim 1, wherein the axial facing surface is formed by a corrugated or ribbed surface.

13. The seal ring assembly of claim 1, wherein the radially outer tapered surface and the radially inner tapered surface of the one of the first and second seal rings have the axial facing surface disposed therebetween, and both the radially outer tapered surfaces and the radially inner tapered surface are configured to reduce a contact area or a surface area of the axial facing surface.

14. A seal ring assembly comprising:
 a seal casing defining a radially inwardly directed channel;
 a first seal ring axially disposed from a second seal ring, the first seal ring having a first axial face opposing a second axial face of the second seal ring, a radial oil channel defined between the first axial face and the second axial face, both the first seal ring and the second seal ring comprising a tapered surface configured to contact a spring, the spring configured to bias the first seal ring away from the second seal ring via the tapered surface, the first seal ring and the second seal ring disposed in the radially inwardly directed channel;
 at least one of the first seal ring or the second seal ring comprising a plurality of evenly spaced protrusions that extend beyond the first axial face or the second axial face, wherein the plurality of protrusions are configured to create a passageway to allow oil to flow through the passageway and to allow at least one of the first seal ring or the second seal ring to move by reducing static friction between the first axial face and the second axial face, each of the plurality of protrusions having a radially outer tapered surface and a radially inner tapered surface with an axial facing surface disposed between the radially outer tapered surface and the radially inner tapered surface, the radially inner tapered surface is the bottommost surface of at least one of the protrusions, both of the radially outer tapered surface and the radially inner tapered surface are configured to facilitate oil flow past each of the protrusions; and
 wherein the plurality of protrusions extend about one third to about one half of the way into the radial oil channel, wherein the combined surface area of the axial facing surfaces is less than half of the surface area of the rest of the first or second axial face of the one of the first or second seal rings, and wherein both the first seal ring and the second seal ring comprise a wearable material located at an inner radial position thereof, the wearable material configured to reduce wear on a rotor shaft.

15. The seal ring assembly of claim 14, wherein both the radially outer tapered surfaces and the radially inner tapered surface of the one of the first and second seal rings are configured to reduce a contact area or a surface area of the axial facing surface.

16. The seal ring assembly of claim 15, wherein the plurality of protrusions are disposed at substantially equal intervals along at least one of the first axial face or the second axial face.

17. The seal ring assembly of claim 16, wherein the plurality of protrusions are disposed on the first axial face, and spaced about 60 degrees from each other along the first axial face.

18. The seal ring assembly of claim 16, wherein the plurality of protrusions are disposed at substantially equal intervals along both the first axial face and the second axial face.

19. The seal ring assembly of claim 15, wherein each of the plurality of protrusions has a generally oval shaped footprint.

20. The seal ring assembly of claim 15, wherein the axial face is formed by a corrugated or ribbed surface.

* * * * *